US008164481B2

(12) United States Patent
Klaus et al.

(10) Patent No.: US 8,164,481 B2
(45) Date of Patent: Apr. 24, 2012

(54) SYSTEM AND METHOD FOR CONDUCTING BI-DIRECTIONAL COMMUNICATION SESSIONS WITH UTILITY METERS FROM A MOBILE DEVICE

(75) Inventors: Arthur John Klaus, Adamstown, MD (US); Timothy Clark Winter, Columbia, MD (US); Minakshisundaran Balasubramanian Anand, Germantown, MD (US)

(73) Assignee: Cooper Technologies Company, Houston, TX (US)

( * ) Notice: Subject to any disclaimer, the term of this patent is extended or adjusted under 35 U.S.C. 154(b) by 1093 days.

(21) Appl. No.: 12/071,834

(22) Filed: Feb. 27, 2008

(65) Prior Publication Data

US 2008/0150752 A1 Jun. 26, 2008

Related U.S. Application Data

(63) Continuation-in-part of application No. 11/600,227, filed on Nov. 16, 2006, now abandoned.

(51) Int. Cl.
*G08C 15/06* (2006.01)
(52) U.S. Cl. ............... 340/870.02; 340/870.03; 700/295
(58) Field of Classification Search ............. 340/870.02, 340/870.03; 700/295
See application file for complete search history.

(56) References Cited

U.S. PATENT DOCUMENTS

| | | | |
|---|---|---|---|
| 4,119,948 A | 10/1978 | Ward et al. | |
| 5,239,584 A | 8/1993 | Hershey et al. | |
| 5,628,055 A | 5/1997 | Stein | |
| 6,236,197 B1 | 5/2001 | Holdsclaw et al. | |
| 7,089,089 B2 | 8/2006 | Cumming et al. | |
| 7,109,882 B2 | 9/2006 | Angelis et al. | |
| 7,116,243 B2 | 10/2006 | Schleich et al. | |
| 2005/0068194 A1* | 3/2005 | Schleich et al. | 340/870.02 |
| 2006/0119488 A1 | 6/2006 | Hoiness | |

* cited by examiner

*Primary Examiner* — Timothy Edwards, Jr.
(74) *Attorney, Agent, or Firm* — King & Spalding LLP

(57) ABSTRACT

A system and method for conducting bi-directional communication sessions with sensing and control devices, such as utility meters, from a mobile device. A system for conducting bi-directional communication sessions with utility meters from a mobile device includes a mobile device capable of acquiring a communication session with a meter unit connected to a utility meter, a vehicle in which the mobile device is located, and a plurality of meter units connected to a plurality of utility meters. The meter units are capable of receiving and executing commands to obtain data and perform actions on the utility meters. The actions include a peak consumption value reset of the utility meter. Each command message includes a token that enables the endpoint radio transceiver devices to determine the commanded one or more operations have been performed.

21 Claims, 9 Drawing Sheets

SYSTEM AND METHOD FOR CONDUCTING BI-DIRECTIONAL COMMUNICATION SESSIONS WITH UTILITY METERS FROM A MOBILE DEVICE

CROSS-REFERENCE TO RELATED APPLICATION(S)

This application is a Continuation-In-Part application of U.S. patent application Ser. No. 11/600,227, entitled "System and Method for Conducting Bi-Directional Communication Sessions With Utility Meters From a Mobile Device," filed Nov. 16, 2006, now abandoned which is hereby incorporated by reference in its entirety.

BACKGROUND

Systems for automatically reading meters from a mobile device such as a van using wireless communications are well-known in the art. For example, U.S. Pat. No. 4,119,948, issued as early as October 1978, describes a remote meter reading system, which, although not making explicit mention of mobile reading of meters, does mention remotely reading a meter using transponders.

Further, mobile AMR (automated meter reading) systems have been available as a product and been in wide use in the utility industry for many years, if not decades. For example, the Itron Mobile Collection System (MCS), supplied by Itron, Inc. of Spokane, Wash., is a well-known product in the industry.

All such systems are limited to simply collecting the meter data. The techniques used for collecting the meter data vary. In the conventional "wake-up" or "bubble-up" techniques the meters either periodically broadcast the data and the mobile data collector device simply grabs the readings as it passes by or the mobile device continually broadcasts a wake-up tone, upon hearing which the meters wake up and transmit their meter data. In more recent point-to-point communication techniques, the mobile data collector device communicates with individual meter device in turn and obtains the meter reading. The order in which the meter devices are read can be sequential according some pre-determined route or it can be optimized based on various parameters, as described in U.S. Pat. No. 7,109,882.

SUMMARY

An advantage of the embodiments described herein is that they overcome the disadvantages of the prior art. This advantage and others are achieved by a system for conducting bi-directional communication sessions with utility meters from a mobile device which includes a mobile device capable of acquiring a communication session with a meter unit connected to a utility meter, a vehicle in which the mobile device is located, and a plurality of meter units connected to a plurality of utility meters. The meter units are capable of receiving and executing commands to obtain data and perform actions on the utility meters. The actions include a peak consumption value reset of the utility meter.

These advantages and others are also achieved by a method for conducting bi-directional communication sessions with utility meters from a mobile device. The method includes the mobile device acquiring a communication session with a meter unit that is connected to a utility meter, the mobile device commanding the meter unit to obtain data from the utility meter, the mobile device receiving the obtained data from the meter unit, and the mobile device commanding the meter unit to reset the peak consumption value of the utility meter.

These advantages and others are also achieved by a system for collecting data from and performing one or more operations on a plurality of sensing and control devices. The system includes a mobile radio transceiver device and a plurality of endpoint radio transceiver devices each of which is coupled to each of the plurality of sensing and control devices. A bi-directional communication session is established between said mobile radio transceiver device and each of said plurality of endpoint radio transceiver devices in turn for the purpose of collecting data from and performing one or more operations on each of said plurality of endpoint sensing and control devices. Each message exchanged during said bi-directional communication session is acknowledged individually by the recipient of the message.

These advantages and others are also achieved by a method of collecting data from and performing one or more operations on a plurality of sensing and control devices, said method utilizing a bi-directional communication sessions between a mobile radio transceiver device and a plurality of endpoint radio transceiver devices coupled to said sensing and control devices. The method includes the mobile radio transceiver device sending an acquisition message addressed to one of the endpoint radio transceiver devices, the addressed endpoint radio device sending an acquisition-response message to the mobile radio transceiver device, the mobile radio transceiver device sending one or more command messages to the addressed endpoint radio transceiver device for the purpose of collecting data from and performing operations on the sensing and control device, the addressed endpoint radio transceiver message confirming the receipt of each command message to the mobile radio transceiver device, the addressed endpoint radio transceiver device sending one or more response messages to the mobile radio transceiver device containing data obtained from the sensing and control device or the results of operations performed on the sensing and control device, the mobile radio transceiver device confirming the receipt of each response message to the endpoint radio transceiver message and the mobile radio transceiver device terminating the bi-directional communication session.

DESCRIPTION OF THE DRAWINGS

The detailed description will refer to the following drawings, wherein like numerals refer to like elements, and wherein.

DETAILED DESCRIPTION

Figure 1:
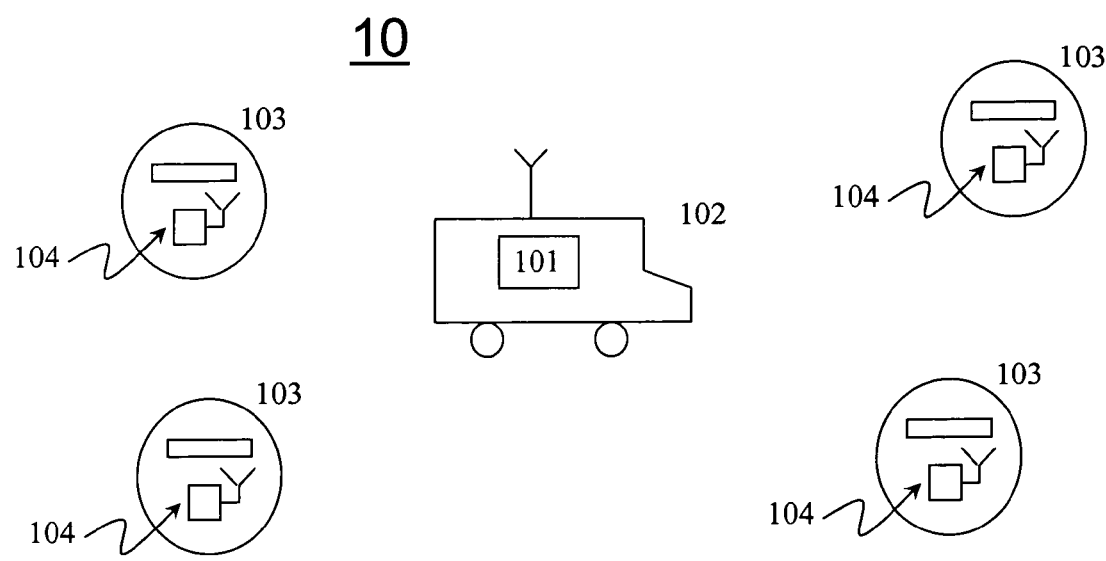
FIG. 1 is a block diagram illustrating an embodiment of a system for conducting bi-directional communication sessions with utility meters from a mobile device.

Described herein are a system and method for conducting bi-directional communication sessions with utility meters, and similar devices, from a mobile device. As noted above, all systems known in the art at present are restricted to collecting meter data, although the collected data can include not only the meter reading but also other event data such outages etc. No system is known whereby a bi-directional communication session is established with each meter endpoint from a mobile device for the purpose of not only collecting the meter data but also sending commands to the meter unit.

The utility industry is in need of such a bi-directional system since a significant proportion of a utility's meter population stores not only the consumption data but also the peak consumption occurring during a period. In these meters, the utility generates bills to the consumer based on the total consumption over a period as well as on the peak consumption hit by the consumer during the billing period. Thus, for these meters, the utility is required to read the meter, the reading consisting of both total consumption as well as peak consumption and then reset the peak consumption stored in the meter so that a new peak consumption will be recorded and read in the next billing period. In the absence of a bi-directional mobile AMR system, the only means of accomplishing the above task available to the utility is to fall back on a non-automated means, viz., that of a meter reader physically visiting the meter and performing a reset of the peak consumption through a reset button provided on the meter.

There is thus a strong need for a system and method for providing bi-directional communications between a mobile device and the meter endpoint, thus automating the above task. Embodiments described herein provide a system that allows the establishment of a bi-directional communication session between a mobile device and a utility meter, enabling the reading of as well as the sending of commands to the meter from the mobile device.

In embodiments, a mobile radio transceiver device first continually tries to establish a bi-directional communication session with each of several meter units in turn through the means of transmitting an acquisition message addressed to each meter unit in turn. The meter unit, upon receiving the acquisition message, acknowledges reception to the mobile device, thus enabling the formation of a communication session between the mobile device and the meter unit. Optionally, both the mobile device and the meter unit then engage in mutual authentication message exchanges to verify the identity of the other device. Subsequently, the mobile device sends one or more commands to the meter unit to read the meter, perform some operation on the meter such a resetting the peak demand etc. Each of the messages exchanged during the communication session is acknowledged on both sides of the session, i.e., messages sent by the mobile device are acknowledged by the meter unit and then responded to and vice versa. Finally, the communication session is ended through the means of a disconnect message which can be sent by either the mobile unit or the meter unit.

With reference now to FIG. 1, shown is an overview of an embodiment of system 10 for conducting bi-directional communication sessions with utility meters (or other devices) from a mobile device. Mobile radio transceiver device 101 is located, for example, in a truck 102, van or other vehicle, that is driven through an area where meters 103 are located. Each meter 103 is equipped with a radio transceiver device 104, referred to herein as meter unit. As mobile device 101 passes through the area, it establishes a bi-directional communication session with each of meter units 104 in turn for the purpose of reading meters 103 and sending commands to meter 103. Mobile device 101 may conduct multiple communications sessions simultaneously, establishing bi-directional communication sessions with multiple meter units 104 at the same time. A detailed description of exemplary steps involved in the establishment of this communication session and the messages exchanged is described below.

Mobile device 101 may be any type of computer capable of performing the actions described herein and transmitting and receiving messages to and from meter units 104. Mobile device 101 may be limited purpose computers designed and operating solely for the purposes described herein or a general purpose computer programmed to perform the actions and execute the methods described herein. For example, mobile device 101 may be a notebook, desktop, handheld or other type of computer. Mobile device 101 may be PDA, mobile phone, BlackBerry™ or other similar device programmed to send and receive commands and perform the actions and methods described herein. Mobile device 101 may communicate with meter units 104 through known communication means and over known frequencies on known spectrums. Meter units 104 may likewise be limited to any type of computer capable of performing the actions described herein and transmitting and receiving messages to and from mobile devices 101.

Figure 2A:
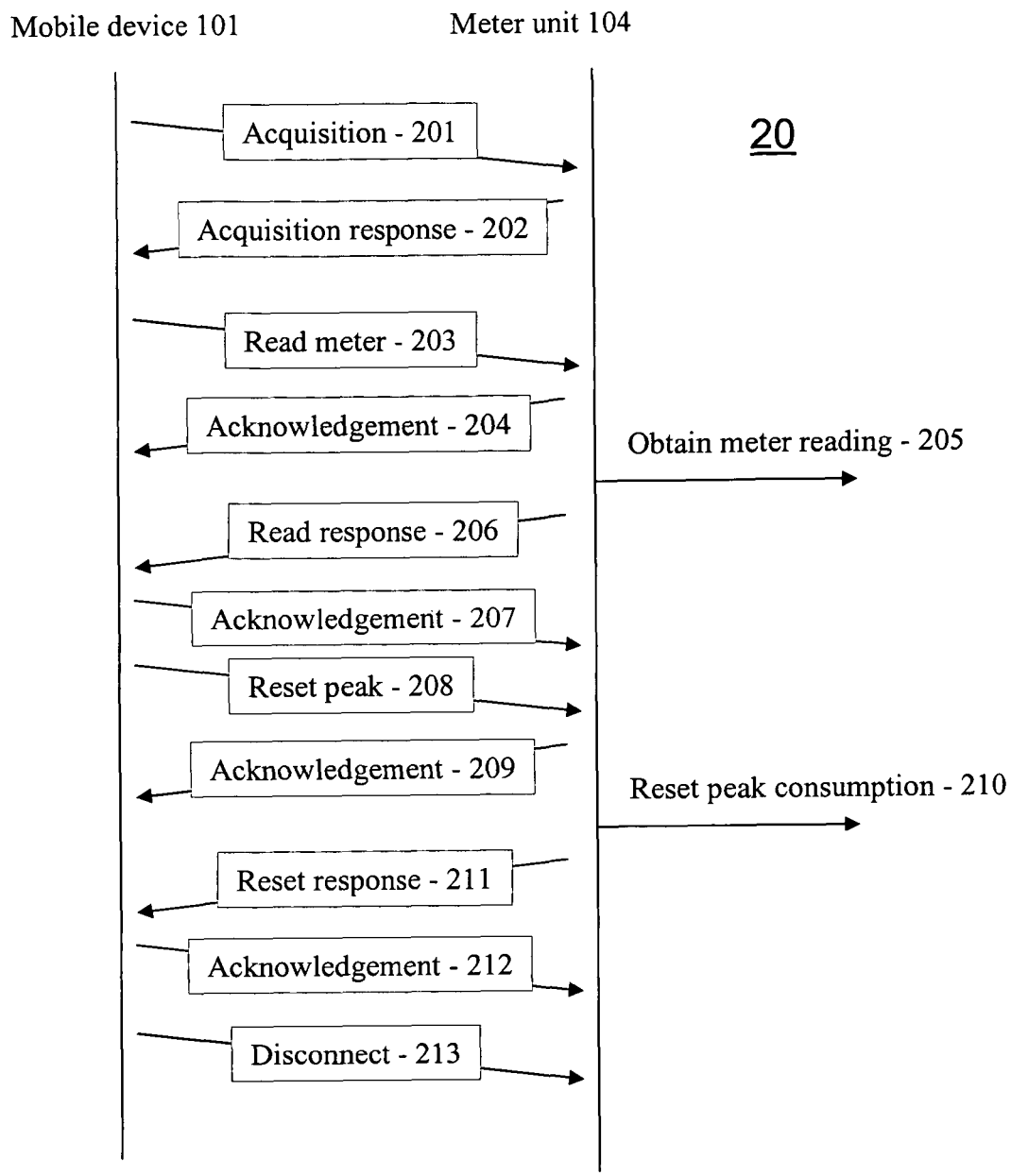
FIGS. 2A-2F are a series of flow diagrams illustrating embodiments of a method for conducting bi-directional communication sessions with utility meters from a mobile device.

With reference now to FIGS. 2A-2F, shown are schematic flow diagrams illustrating embodiments of a method 20 for conducting bi-directional communication sessions with utility meters from a mobile device. The diagrams illustrate exemplary actions or the steps involved in establishing a bi-directional communication session and the messages exchanged in embodiments of method 20. With reference now to FIG. 2A, the mobile device 101 sends an acquisition message addressed to a particular meter unit 104, block 201. Mobile device 101 may select a particular meter unit 104 from among the potentially many meter units using techniques or methodologies known in the art. For example, mobile device 101 may use knowledge of its current location, obtained using a Global Positioning System (GPS) device, located in truck 102 or incorporated into mobile device 101, and knowledge of each meter units' 104 physical location to deduce a particular meter unit 104 in radio range. If several meter units 104 are in range, mobile device 101 can simply pick one among the several meter units 104 and then continue the process of picking the next meter unit 104. Alternatively, mobile device 101 can use some heuristic(s) or other algorithm(s) to pick a meter unit 104, such as consideration of the truck speed and direction of travel, historical data etc. Such algorithms are well-known in the art, and are described in, for example, U.S. Pat. No. 7,109,882.

With continuing reference to FIG. 2A, meter unit 104, to which the acquisition message is addressed, responds with an acquisition response, block 202, thus signaling to mobile device 101 the establishment of a communication session. Subsequently, mobile device 101 sends a message to meter unit 104 to read the meter 103, block 203. Meter unit 104 acknowledges receipt of this message, block 204, reads the meter 103 (obtain meter reading), block 205, and then sends a read response message back to mobile device 101, block 206. Mobile device 101 acknowledges receipt of the meter reading message, block 207. Subsequently, mobile device 101 sends a command to the meter unit to perform a reset of the peak consumption, block 208. The peak consumption is the highest rate of power consumption, e.g., in kW, that the meter 103 has recorded. Meter unit 104 acknowledges receipt of this command, block 209, performs a reset of the peak consumption in the meter (reset peak consumption), block 210, and then communicates a reset response message back to mobile device 10 that the reset has been performed, block 211. Mobile device 101 acknowledges the receipt of this message, block 212. Finally, mobile device 101 sends a disconnection message to meter unit 104, block 213, indicating the end of the communication session. The whole process may then be repeated by mobile device 101 for the next meter unit 104.

Figure 2B:
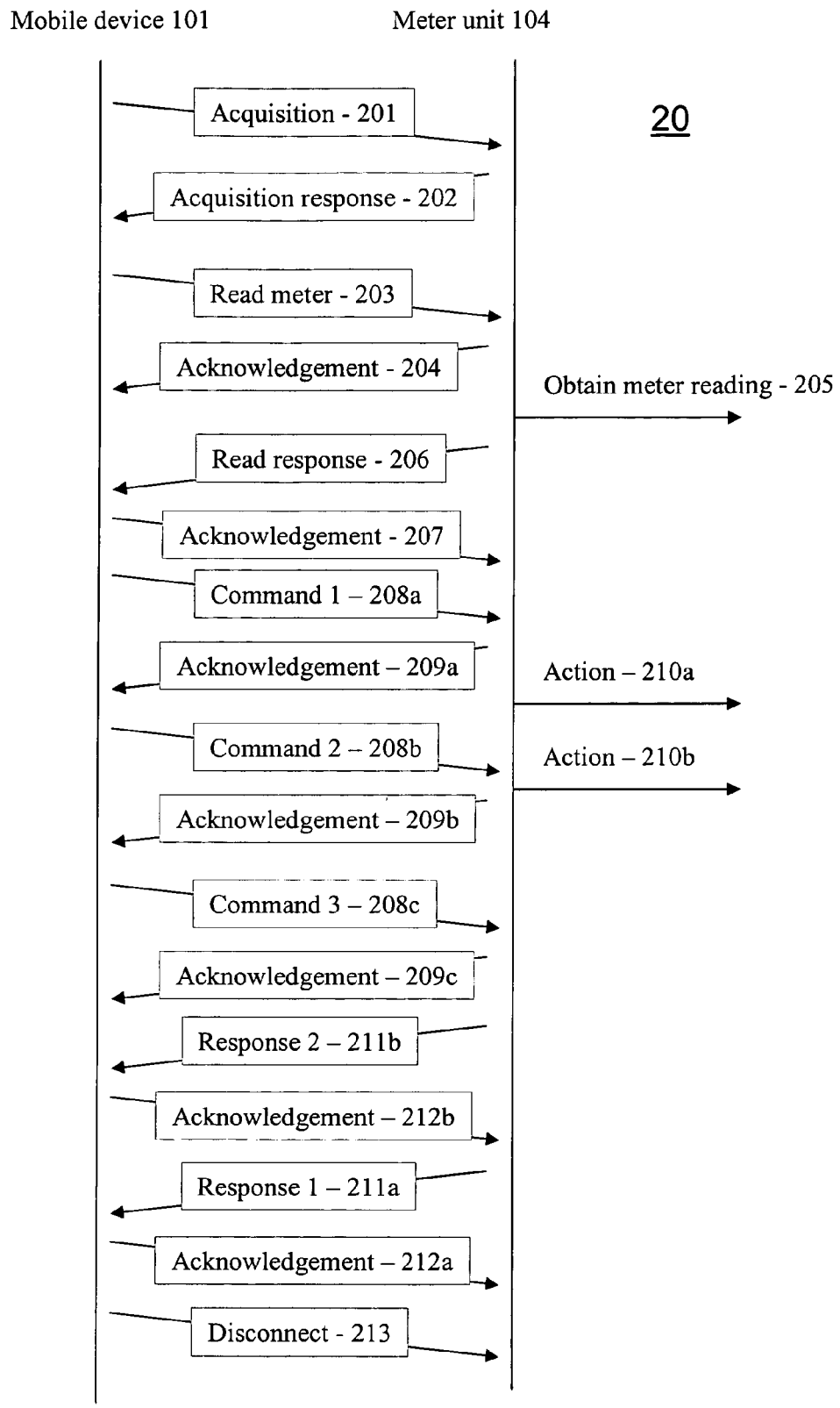

It will be recognized that variations in the sequence of steps described in the embodiment above are possible. For example, with reference now to FIG. 2B, multiple command messages, e.g., blocks 208a, 208b, 208c, may be exchanged between mobile device 101 and meter unit 104. Each of these command messages 208a, 208b, 208c is individually acknowledged by meter unit 104, blocks 209a, 209b, 209c, and the corresponding actions performed, blocks 210a, 210b. Some of these commands 208a, 208b, 208c may require meter unit 104 to perform an action 210a, 210b on the meter 103, such as the resetting of the peak consumption. Other actions may be performed on meter unit 104 itself. Examples of such actions might be to perform a time synchronization whereby meter unit 104 synchronizes its time with mobile device 101. Furthermore, while some actions may elicit responses from meter unit 104, blocks 211a, 211b etc., some commands may not elicit a response. For example, as shown in FIG. 2B, for the command message 208c, there is no corresponding response where a response message is sent. It must, however, be noted that even in those cases, the receipt of command message 208c is nonetheless confirmed by meter unit 104 through acknowledgement message 209c.

Moreover, it must also be noted that while each command message 208a, 208b, 208c is acknowledged by an acknowledgement message 209a, 209b, 209c, it is not necessary that the corresponding response messages 211a, 211b come in order. Thus, for example, response message 211b may come before response message 211a. This may be due to certain actions taking longer to process.

Figure 2C:
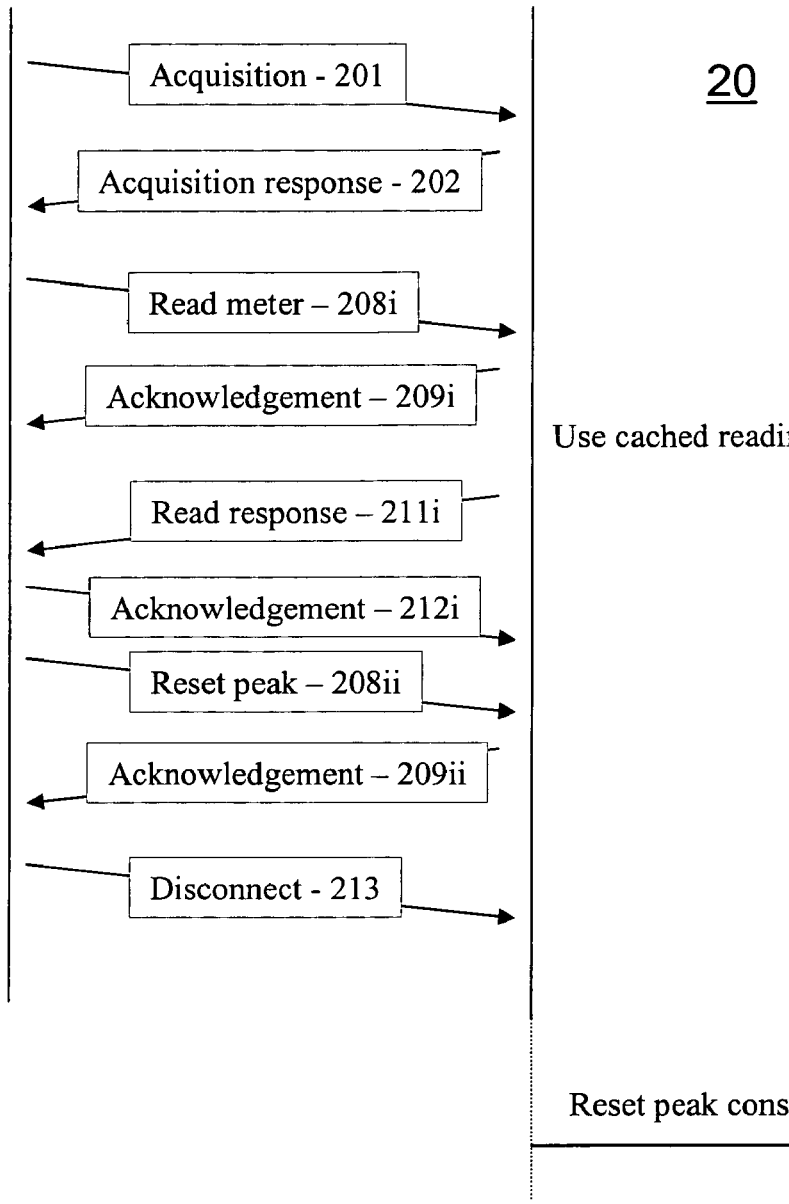

It can also be recognized that in a variation of the above embodiments, command messages sent by mobile device 101 may be responded to by meter unit 104 with delayed action on the meter 103 or a response based on a information stored already in meter unit 104 based on previous action. With reference now to FIG. 2C, shown is an example of this variation in another embodiment of method 20 for conducting bi-directional communication sessions with utility meters from a mobile device. Here, mobile device 101 sends a command, block 208i, to meter unit 104 requesting a meter reading. Meter unit 104 acknowledges receipt of this command, block 209i, then sends the meter reading (read response), block 211i, based on information available in its memory cache from when meter unit 104 read the meter 103 last, as part of its periodic reading of the meter 103. Next, mobile device 101 sends a command to reset the peak consumption, block 208ii. Meter unit 104 acknowledges receipt of this command, block 209ii, but defers the performing of the peak consumption reset, block 210, on the meter 103 until later. The reason for such deferral may be that the meter 103 requires certain actions, e.g., such as the reset of the peak consumption, to be performed at certain times, e.g., such as at 15-minute boundaries of time. Accordingly, mobile device 101 may disconnect, block 213, prior to the peak consumption reset 210.

Figure 2D:
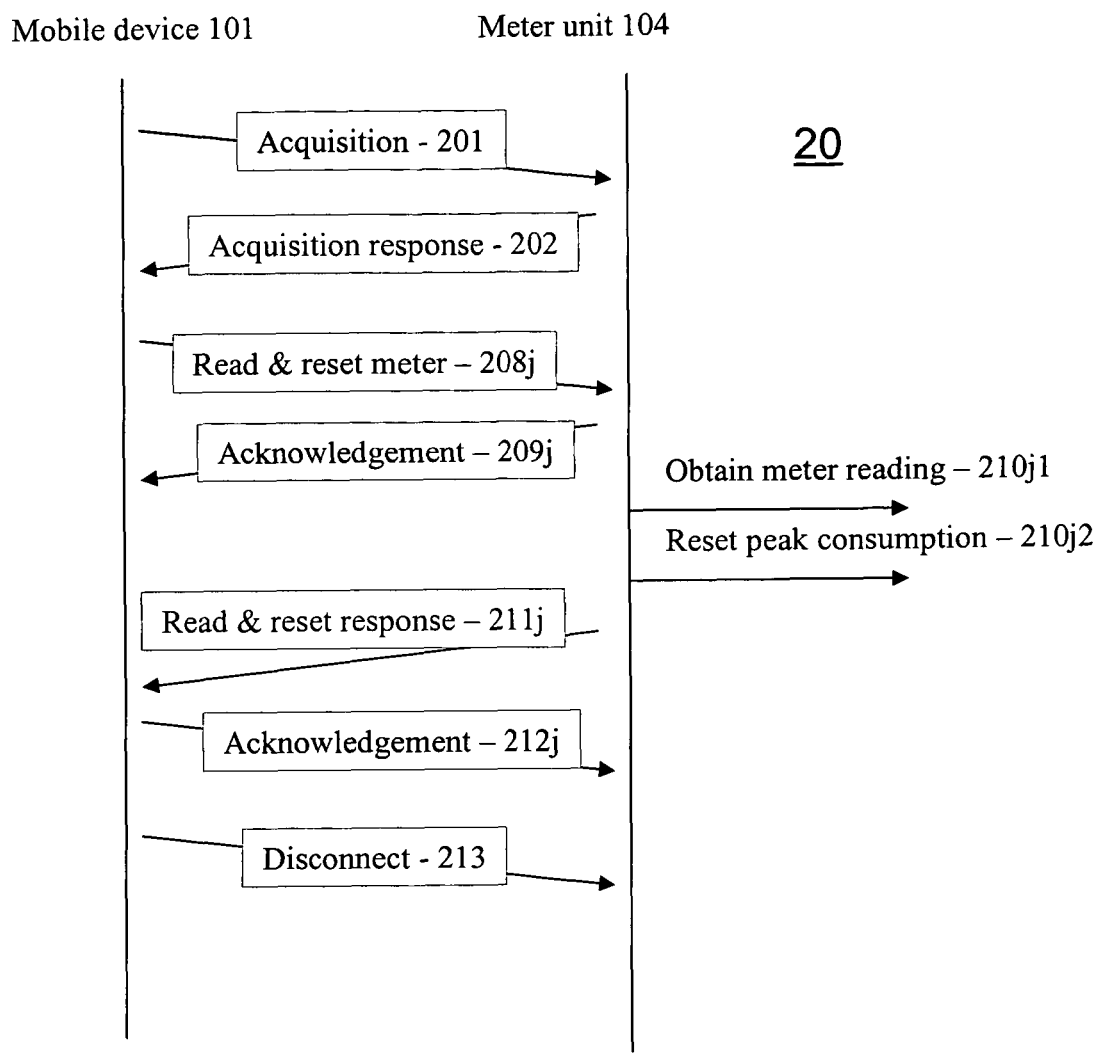

Moreover, it will also be recognized that the command messages sent from mobile device 101 can be so constructed as to indicate that meter unit 104 should perform multiple actions, in order to reduce the amount of time necessary to complete all actions. With reference now to FIG. 2D, shown is another embodiment of method 20 for conducting bi-directional communication sessions with utility meters from a mobile device. Here mobile device 104 sends a command, block 208j, that indicates to meter unit 104 to both read the meter 103 as well as to reset the peak consumption. Thus, meter unit 104 acknowledges receipt of the command message, block 209j, then performs a meter reading, block 210j1, subsequently performs a reset of the peak consumption, block 210j2, and then sends a response message back to mobile device 101, block 211j, which contains both the meter readings as well as indication that the peak consumption reset has been performed.

Figure 2E:
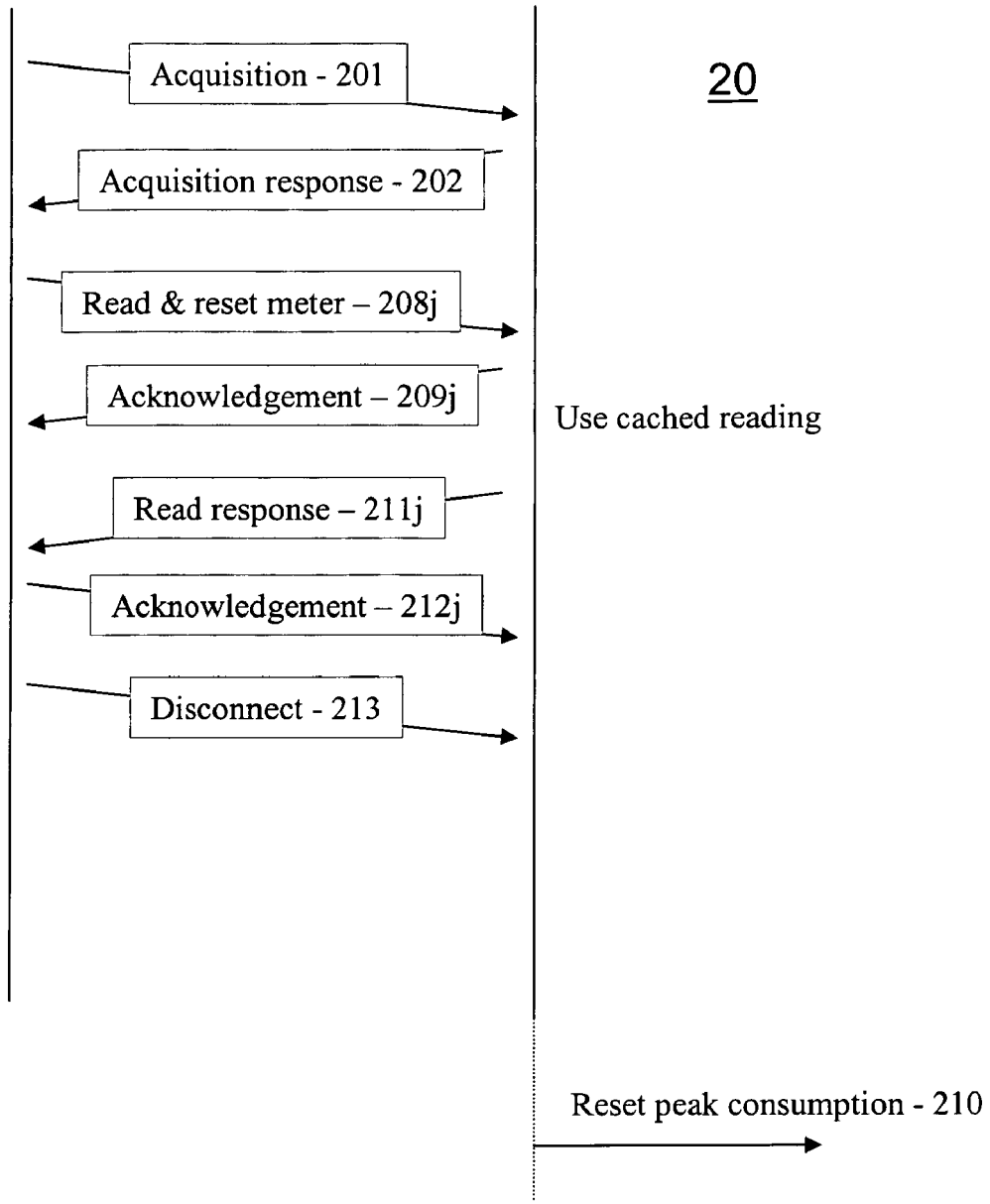

Further, the variations described above with regards FIGS. 2C and 2D may be combined as well. With reference now to FIG. 2E, in a single action mobile device 101 can command meter unit 104 to perform a read as well as a peak consumption reset, block 208j. Meter unit 104 then acknowledges receipt of this message, block 209j, and then respond with reading a message from its memory cache and defers performing the reset of the peak consumption, block 210 until later.

Further, it must be recognized that while the various message exchanges in 208, 209 and 211 are proceeding, mobile device 101 will generally be constantly in motion. In the other words, the bi-directional communication session is usually established and maintained while mobile device 101 is in motion.

Figure 2F:
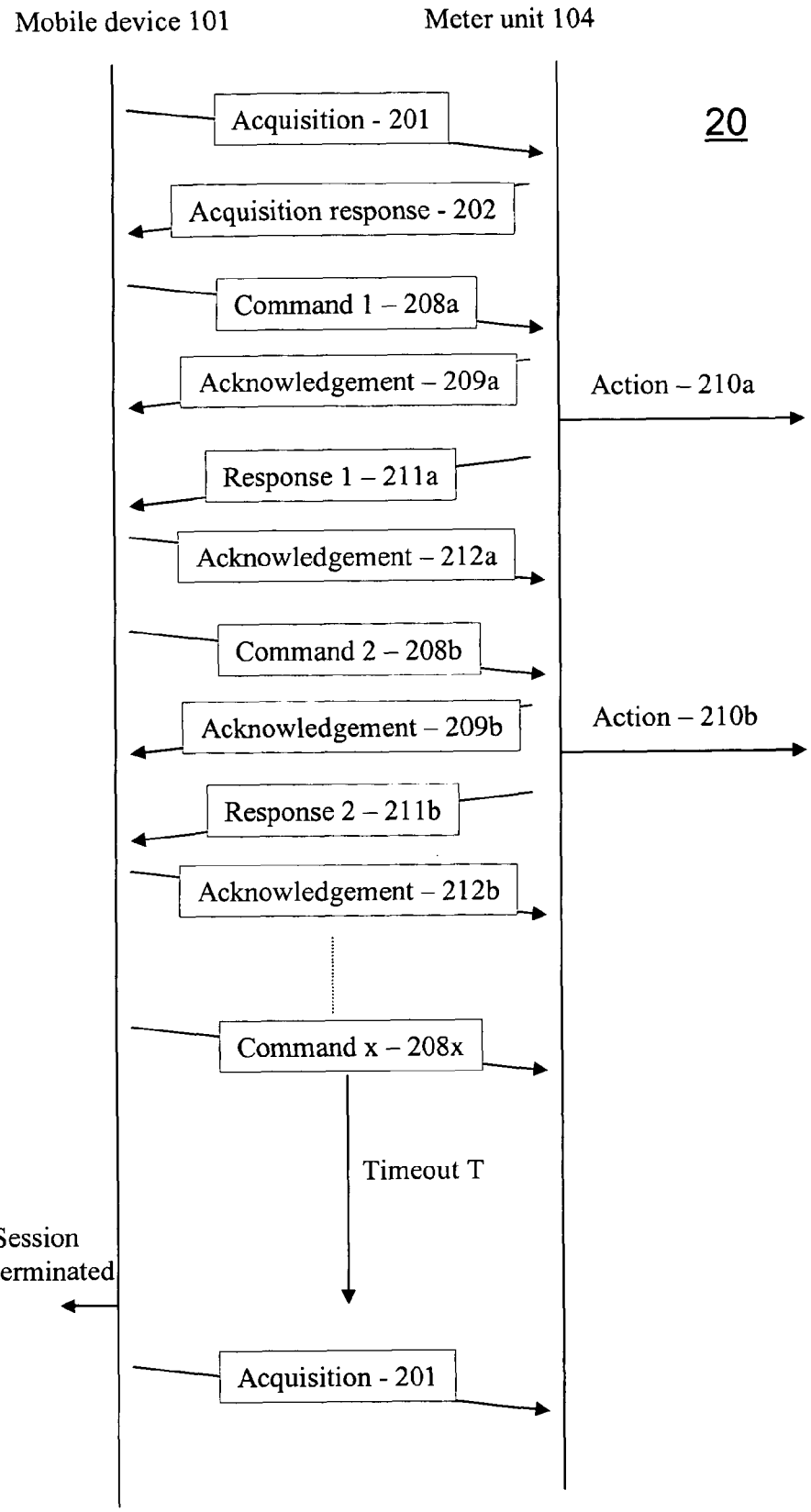

It is recognized that the acknowledgement of each message by both mobile device 101 and meter unit 104 provides for a reliable bi-directional communication session. This allows the detection of failure of the communication link at any point during the communication session through the means of setting appropriate timeouts on the mobile device and the meter unit. With reference now to FIG. 2F, shown is another embodiment of method 20, in which a communication link fails. If mobile device 101 does not receive an acknowledgement for one of its command messages, e.g., sent block 208x, within the timeout period T, mobile device 101 considers the communication session to be terminated and proceeds to re-establish the session beginning with again with the sending an acquisition message, block 201.

Figure 3:
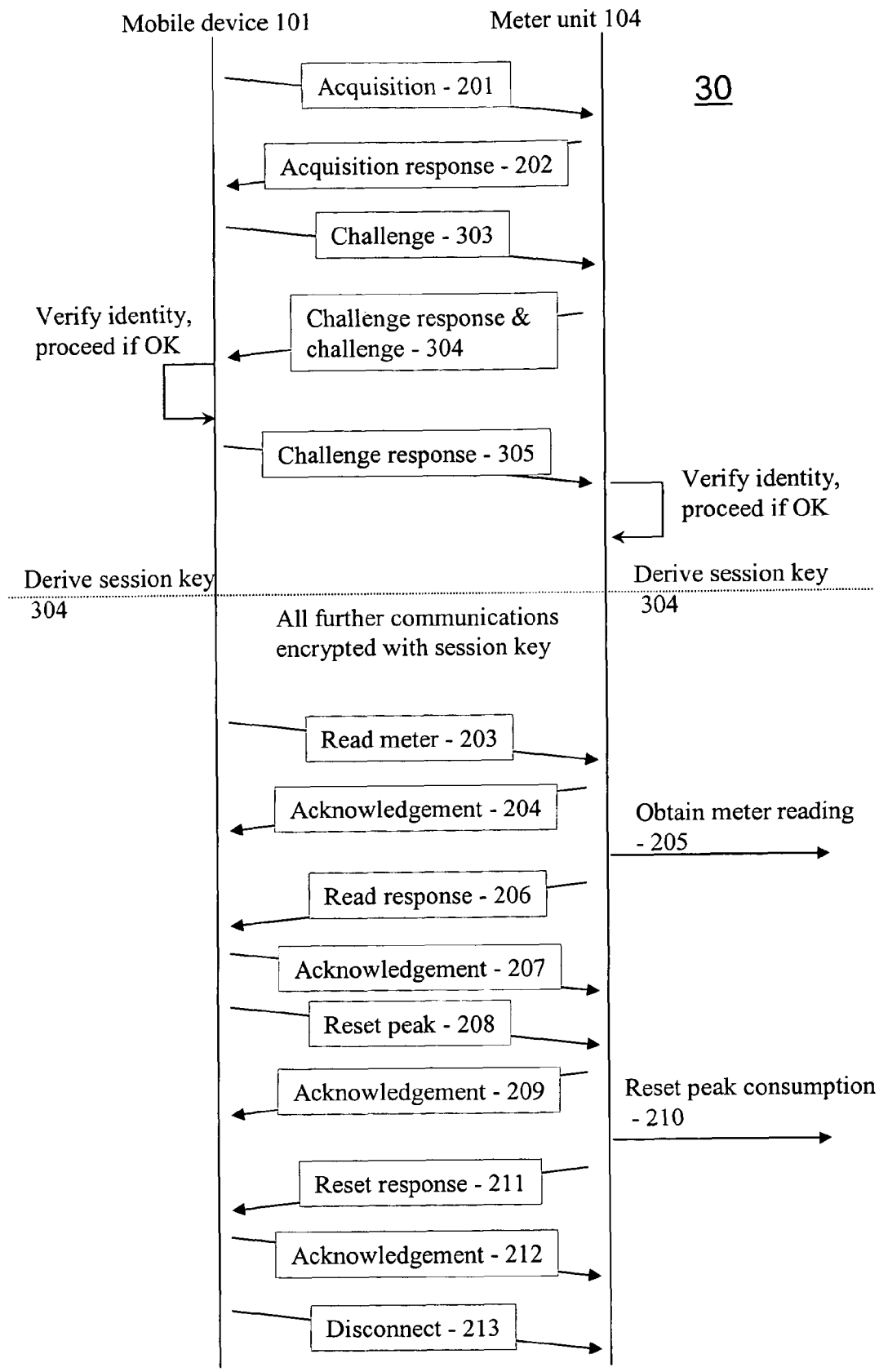
FIG. 3 is a flow diagram illustrating another embodiment of a method for conducting bi-directional communication sessions with utility meters from a mobile device.

With reference to FIG. 3, shown is yet another embodiment of method 30 for conducting bi-directional communication sessions with utility meters from a mobile device that includes the performing of mutual authentication by both mobile device 101 and meter unit 104. As in the previous embodiments, acquisition 201 and acquisition response 202 include mobile device 101 sending an acquisition message and meter unit 104 responding with an acquisition response respectively. Subsequently, mobile device 101 sends a challenge message, block 303. Meter unit 104 uses the information embedded in the challenge message, along with a pre-shared secret key known to both mobile device 101 and meter unit 104 to encrypt information regarding its identity. Meter unit 104 then combines this encrypted identity information as well as its own challenge and sends a response to mobile device 101, block 304. Mobile device 101 extracts the encrypted identity information and uses that to verify the authenticity of the responding meter unit 104. Further, mobile device 101 uses the information in the challenge from meter unit 104 to encrypt its own identity information and send it back to meter unit, block 305. Meter unit 104 then verifies the identity of mobile device 101 based on this identity information. Subsequently, the message exchanges related to sending meter data and sending commands to meter unit 104 proceed as described in the previous embodiments. Here, optionally mobile device 101 and meter unit 104 can derive a session key from the initial mutual authentication exchange, block 306, and use that key to encrypt all subsequent communications, so that the message exchanges pertaining to meter data and commands are all securely encrypted.

Figure 4:
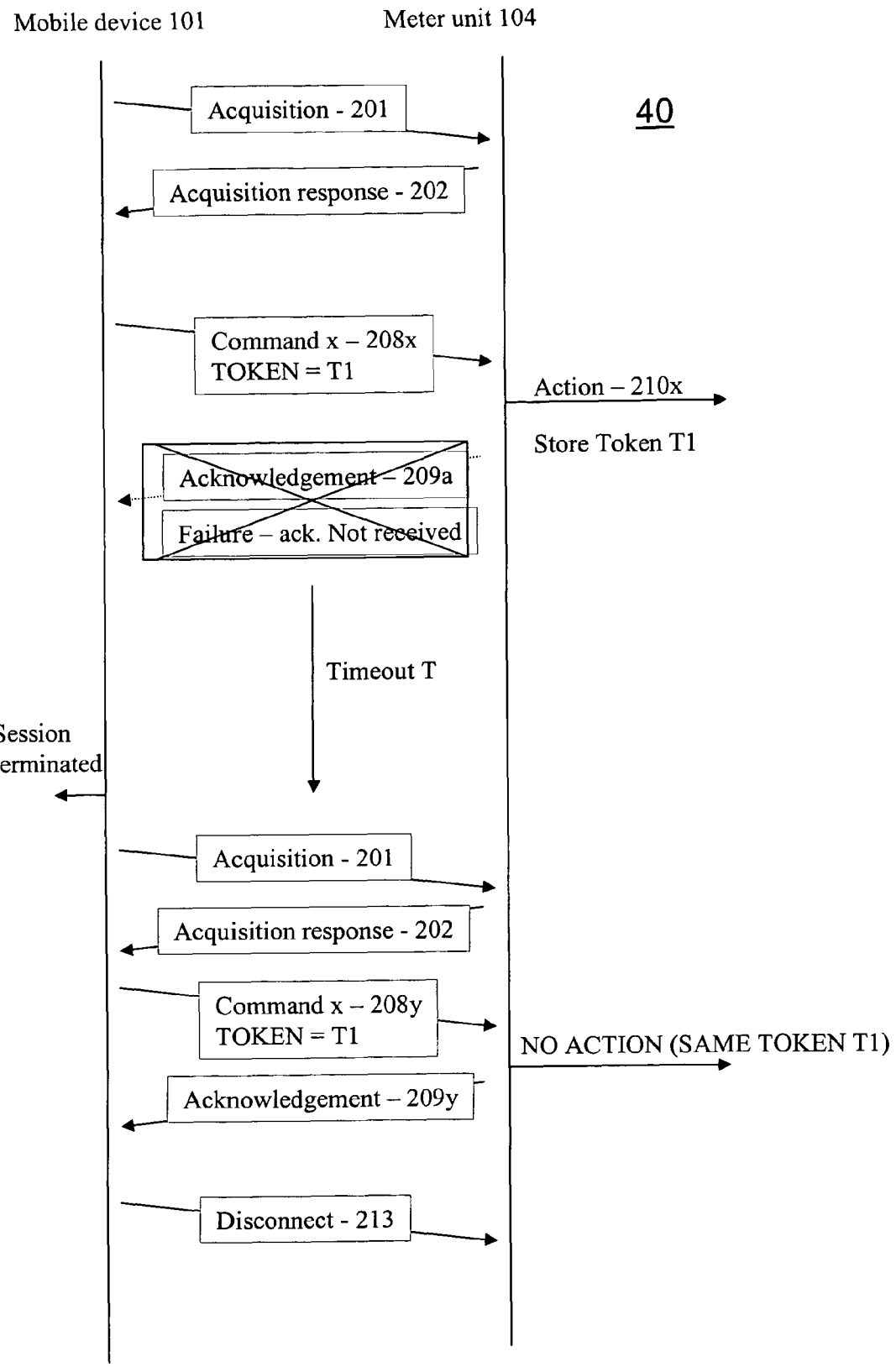
FIG. 4 is flow diagram illustrating another embodiment of a method for conducting bi-directional communication sessions with utility meters from a mobile device incorporating command tokens.

With reference now to FIG. 4, shown is yet another embodiment method 40 for conducting bi-directional communication sessions with utility meters from a mobile device that includes command tokens. The embodiment shown accounts for a special case of the embodiment described with reference to FIG. 2F, wherein the communication session is abnormally terminated before a response to one of the command messages sent by the mobile device is received by the mobile device. As described previously with reference to FIG. 2F, in such a scenario the mobile device 101 considers the communication session to be terminated and proceeds to re-establish the session beginning with again with the sending an acquisition message, block 201. However, the meter unit 104 may, in fact, have received the command and already taken the appropriate action as indicated by the command.

As illustrated in FIG. 4, the communication link fails after the mobile device sends one of the command messages, block 208x. The mobile device then re-establishes the communication session after the timeout period T, and re-sends the command, block 208y. However, the meter unit has already received the command and taken the appropriate action, block 210x. Depending on the command, it may be undesirable to re-perform the action. Such a situation arises, for example, when the command and corresponding action consist of resetting the peak demand in the utility meter. In this case, it is clearly undesirable to reset the peak demand twice in succession since a peak may have occurred in the time window between the two resets, which would then be lost, thus potentially leading to lost revenue. Therefore, in order to prevent such an occurrence, the embodiment also allows for the addition of a token in the command messages sent from the mobile device to the meter unit (a "command token"). The token is unique to each cycle of action; consequently, in the case of the reset of the peak demand, a unique token would be used for each billing cycle. As a result, as seen the FIG. 4, the meter unit, besides performing the action required 210x, upon receiving a command 208x, also stores the token T1 associated with the command. Subsequently, if and when an abnormal termination of a communication session occurs and the mobile device re-establishes the communication session and re-sends the same command 208y, the meter unit compares the token in the command and concludes that it is the same command that was received and acted upon previously. Accordingly, the meter unit takes no action other than to acknowledge the receipt of the command, so that the mobile device then disconnects the communication session normally. In this way, through the use of unique tokens the embodiment shown also includes a mechanism to ensure that actions that are undesirable to repeat will not be erroneously performed repetitively even in the face of abnormal terminations of the communication session.

It should be noted although the above embodiments describe the mobile radio device establishing a single communication session with a single meter unit at any one time, the embodiments described herein are by no means restricted to a single session. The mobile radio device could embed within it multiple radio transceiver units, or could be constructed to be capable of multiplexing and demultiplexing multiple transmit and receive data streams, and could thus be controlled to establish multiple simultaneous communication sessions with different meter units at the same time. This would provide the additional advantage of being able to simultaneously read and perform operations on multiple meter units, thus improving the performance of the system.

It should be noted that although the above embodiments related to utility meters, the invention is by no means restricted to establishing bi-directional communication sessions with utility meters only. Other types of devices where a bi-directional communications session between a mobile radio device and an endpoint radio device is of use, equally fall under the scope of this invention. For example, the mobile device can communicate with and establish bi-directional communication sessions with endpoint radio transceiver devices coupled to sensing devices located in package dropboxes or vending machines for the purpose of sensing whether packages are available to pick-up or whether servicing is needed. Such applications of the invention presented herein will occur readily to those versed in the art and are within the scope of this invention.

Further enhancements and added features to the system and the means described in the foregoing embodiment will readily occur to those well versed in the art. All such modifications, changes, extensions, variations and other uses and applications which do not depart from the spirit and scope of the invention are deemed to be covered by the invention which is limited only by the claims which follow.

The invention claimed is:

1. A system for collecting data from and performing one or more operations on a plurality of sensing and control devices, said system comprising:
 a mobile radio transceiver device; and
 a plurality of endpoint radio transceiver devices each of which is coupled to each of the plurality of sensing and control devices in which a bi-directional communication session is established between said mobile radio transceiver device and each of said plurality of endpoint radio transceiver devices in turn for the purpose of collecting data from and performing one or more operations on each of said plurality of endpoint sensing and control devices and in which each message exchanged during said bi-directional communication session is acknowledged individually by the recipient of the message and in which each command messages instructing one or more operations includes a token that enables the endpoint radio transceiver device to determine whether the one or more operations have been performed.

2. The system of claim 1 in which the mobile radio transceiver device and the endpoint radio transceiver devices use spread spectrum radio devices.

3. The system of claim 1 in which the mobile transceiver device conducts multiple simultaneous bi-directional communication sessions with endpoint radio transceiver devices.

4. The system of claim 1 in which the sensing and control devices are utility meters and the data collected from the utility meters is meter consumption data and the operation performed on the utility is a reset of the recorded peak consumption.

5. The system of claim 1 in which the sensing and control devices are utility meters and the data collected from the utility meters is meter consumption data and the operation performed on the utility meter includes synchronizing time on the utility meter.

6. The system of claim 5 in which the operation performed on the utility meters further includes a reset of the recorded peak consumption.

7. The system of claim 5 in which the data collected from the utility meters further includes stored load profile data as well as time-of-use consumption data.

8. A method of collecting data from and performing one or more operations on a plurality of sensing and control devices, said method utilizing a bi-directional communication sessions between a mobile radio transceiver device and a plurality of endpoint radio transceiver devices coupled to said sensing and control devices, the method comprising:

the mobile radio transceiver device sending an acquisition message addressed to one of the endpoint radio transceiver devices;

the addressed endpoint radio device sending an acquisition response message to the mobile radio transceiver device;

the mobile radio transceiver device sending one or more command messages to the addressed endpoint radio transceiver device for the purpose of collecting data from and performing operations on the sensing and control device, wherein the sending includes sending a token with each command message;

the addressed endpoint radio transceiver message confirming the receipt of each command message to the mobile radio transceiver device, the addressed endpoint radio transceiver device sending one or more response messages to the mobile radio transceiver device containing data obtained from the sensing and control device or the results of operations performed on the sensing and control device;

the mobile radio transceiver device confirming the receipt of each response message to the endpoint radio transceiver message and;

the mobile radio transceiver device terminating the bi-directional communication session;

the addressed endpoint device comparing the token associated with each command message to previously stored tokens and performing operations on the sensing and control device only if the token does not match any previously stored token.

9. The method of claim 8 further comprising the addressed endpoint device storing the token upon performing operations on the sensing and control device.

10. The method of claim 8 further comprising authenticating the endpoint transceiver device.

11. The method of claim 10 in which authenticating the endpoint transceiver device comprises:

the mobile radio transceiver device sending a first challenge message to the endpoint transceiver device;

the endpoint transceiver device constructing a first challenge response message that includes information pertaining to the endpoint transceiver device identity as well as a second challenge message;

the endpoint transceiver device sending the first challenge response message to the mobile radio transceiver message; and the mobile radio transceiver device verifying the identity of the endpoint radio transceiver device.

12. The method of claim 11 further comprising authenticating the mobile radio transceiver device.

13. The method of claim 12 in which authenticating the mobile radio transceiver device comprises:

the mobile radio transceiver device constructing and sending a second challenge response message that includes information pertaining to the mobile radio transceiver device identity; and, the endpoint radio transceiver device verifying the identity of the mobile radio transceiver device.

14. The method of claim 10 comprising deriving a session key and using this session key to encrypt all further communications.

15. The method of claim 8 in which at least one of the command messages is a command to read a utility meter and least one of the response messages is utility consumption data.

16. The method of claim 8 in which at least one of the command messages is a command to read a utility meter and least one of the response messages is utility consumption data including total consumption and time-of-use consumption data.

17. The method of claim 8 in which at least one of the command messages is a command to read a utility meter and least one of the response messages is load profile data from a utility meter.

18. The method of claim 8 in which at least one of the command messages is a command to perform a reset of the peak consumption on a utility meter and the response message is the result of performing a reset of the peak consumption on the utility meter.

19. The method of claim 8 in which at least one of the command messages is a command to perform a reset of the peak consumption on a utility meter and actual act of performing a reset of the peak consumption on the utility meter is deferred until later.

20. The method of claim 8 in which one or more of the command and response messages pertaining to synchronizing the time on the endpoint radio transceiver device with the time on the mobile radio transceiver device.

21. The method of claim 8 comprising the further step of the endpoint radio transceiver device synchronizing the time on the sensing and control device subsequent to synchronizing its own time.

* * * * *